US007210583B2

(12) United States Patent
Walpus et al.

(10) Patent No.: US 7,210,583 B2
(45) Date of Patent: May 1, 2007

(54) CARD READING SYSTEMS AND METHODS

(75) Inventors: Tim Walpus, Omaha, NE (US); Jay Greene, Omaha, NE (US); Jon Gates, Honey Creek, IA (US); Jeffrey G. Nowlin, Council Bluffs, IA (US)

(73) Assignee: First Data Corporation, Englewood, CO (US)

( * ) Notice: Subject to any disclaimer, the term of this patent is extended or adjusted under 35 U.S.C. 154(b) by 58 days.

(21) Appl. No.: 10/741,586

(22) Filed: Dec. 19, 2003

(65) Prior Publication Data

US 2005/0178698 A1 Aug. 18, 2005

(51) Int. Cl.
*G06K 5/00* (2006.01)
(52) U.S. Cl. ...................... 209/552; 235/380
(58) Field of Classification Search ............... 209/552, 209/567, 569, 583; 235/375, 380
See application file for complete search history.

(56) References Cited

U.S. PATENT DOCUMENTS

| | | | |
|---|---|---|---|
| 2,362,134 A | 11/1944 | Honig | |
| 3,717,337 A | 2/1973 | McCain et al. | |
| 4,060,228 A | 11/1977 | Tress et al. | |
| 4,511,132 A | 4/1985 | Muller | |
| 4,527,793 A | 7/1985 | Bottcher et al. | |
| 4,577,848 A | 3/1986 | Hams | |
| 4,634,107 A | 1/1987 | Vandersyde et al. | |
| 4,697,246 A | 9/1987 | Zemke et al. | |
| 4,718,657 A | 1/1988 | Otter et al. | |
| 4,753,430 A | 6/1988 | Rowe et al. | |
| 4,985,614 A * | 1/1991 | Pease et al. ................ 235/440 |
| 5,082,268 A | 1/1992 | Santoro | |
| 5,088,711 A | 2/1992 | Newsome | |
| 5,151,582 A * | 9/1992 | Fujioka ...................... 235/469 |
| 5,171,005 A | 12/1992 | Manley et al. | |
| 5,327,701 A | 7/1994 | Dronsfield | |
| 5,388,815 A | 2/1995 | Hill et al. | |
| 5,494,544 A * | 2/1996 | Hill et al. ...................... 156/64 |
| 5,647,583 A | 7/1997 | Emigh et al. | |
| 5,722,221 A | 3/1998 | Maltman et al. | |

(Continued)

*Primary Examiner*—Joseph C. Rodriguez
(74) *Attorney, Agent, or Firm*—Townsend and Townsend and Crew LLP

(57) ABSTRACT

A card reader includes a receiving arrangement configured to sequentially receive cards from an upstream process and position the cards to be read. It also includes a first reader configured to read card information from cards a first time and a second reader configured to read card information from cards a second time. The second reader is positioned such that the information is read by the second reader after the information is read by the first reader. The card reader also includes an advancing mechanism configured to advance cards from the receiving arrangement, through the first and second readers, to a downstream process. The card reader also includes a processor programmed to receive card carrier information that identifies at least one card relating to a particular card carrier. The processor also receives card information from the first reader and from the second reader. The processor compares the card information as read by the first reader to the card information as read by the second reader and rejects the card if the card information is inconsistent. The processor also compares the card information as read by either the first or second reader to the card carrier information rejects the card if the card information does not match the card carrier information.

8 Claims, 6 Drawing Sheets

U.S. PATENT DOCUMENTS

| | | | |
|---|---|---|---|
| 5,814,796 A * | 9/1998 | Benson et al. ............... 235/375 |
| 5,886,334 A * | 3/1999 | D'Entremont et al. ...... 235/380 |
| 5,896,725 A | 4/1999 | Lundstrom et al. |
| 6,094,894 A | 8/2000 | Yates |
| 6,135,292 A | 10/2000 | Pettner |
| 6,164,043 A | 12/2000 | Miller |
| 6,202,005 B1 | 3/2001 | Mahaffey |
| 6,267,366 B1 | 7/2001 | Graushar et al. |
| 6,294,032 B1 * | 9/2001 | Weinmann et al. ........... 156/64 |
| 6,349,242 B2 | 2/2002 | Mahaffey |
| 6,394,346 B1 * | 5/2002 | Bonneau et al. ............ 235/438 |
| 6,431,453 B1 * | 8/2002 | Hill et al. .................... 235/475 |
| 6,467,687 B1 * | 10/2002 | Hill et al. .................... 235/448 |
| 6,670,569 B2 | 12/2003 | Smith et al. |
| 2003/0088552 A1 | 5/2003 | Bennett |

* cited by examiner

CARD READING SYSTEMS AND METHODS

CROSS-REFERENCES TO RELATED APPLICATIONS

This application is related to U.S. Pat. No. 6,802,500 entitled "MAIL HANDLING EQUIPMENT AND METHODS," issued Oct. 12, 2004 and to U.S. Pat. No. 6,670,569 entitled "SYSTEM & METHODS OF PROVIDING INSERTS iNTO ENVELOPES," issued on Dec. 30, 2003, the complete disclosures of which are incorporated herein by reference for all purposes.

BACKGROUND OF THE INVENTION

This invention relates generally to the field of mail processing, and in particular to the processing of mail relating to financial institutions. More specifically, the invention relates to devices for reading information from and writing information to cards and properly matching cards with card carriers.

Credit cards play an important role in today's economy. To receive a credit card, a person typically fills out an application which is processed by a bank that will issue the card. If the application is approved, the card needs to be produced and sent to the requestor. Banks often contract another company to produce and issue cards on their behalf. For example, one such company is First Data Resources (FDR).

To issue a card, the bank sends the information to FDR, typically in electronic form. Using this information a card is embossed and initialized with the appropriate information. The card is then attached to a paper carrier and then placed into an envelope for mailing. Existing equipment for performing such steps are commercially available from Bowe, Augsberg, Germany. Optionally, a second sheet and one or more inserts may also be added prior to placement into the envelope.

Unfortunately, such equipment can be expensive, typically on the order of about $1 million. Further, such machines do not provide sufficient error checking in some cases. Further still, such machines are not designed to work with newer cards (e.g., smart cards). As such, this invention relates to other machines and techniques that may be used to process such media in a more cost effective and efficient manner and operate on new card types.

BRIEF SUMMARY OF THE INVENTION

Embodiments of the invention thus provide a card reader. The card reader includes a receiving arrangement configured to sequentially receive cards from an upstream process and position the cards to be read. It also includes a first reader configured to read card information from cards a first time and a second reader configured to read card information from cards a second time. The second reader is positioned such that the information is read by the second reader after the information is read by the first reader. The card reader also includes an advancing mechanism configured to advance cards from the receiving arrangement, through the first and second readers, to a downstream process. The card reader also includes a processor programmed to receive card carrier information that identifies at least one card relating to a particular card carrier. The processor also receives card information from the first reader and from the second reader. The processor compares the card information as read by the first reader to the card information as read by the second reader and rejects the card if the card information is inconsistent. The processor also compares the card information as read by either the first or second reader to the card carrier information rejects the card if the card information does not match the card carrier information. Suitable cards include credit cards, stored value cards, smart cards, retailer cards, gift cards and the like.

In some embodiments, the first and second readers comprise mag stripe readers. The card carrier information may be account numbers for each of a plurality of cards relating to the particular card carrier, the card information may be account numbers of cards and the processor may be programmed further to compare the account numbers of the card information to the account numbers of the card carrier information and reject a particular card if the account number of the card information does not match any account number of the plurality of cards relating to the particular card carrier.

In some embodiments, the card reader also includes a writer configured to write information to cards. The writer may be configured to write at least a portion of the card carrier information to cards. The writer may be configured to write at least a portion of the card information to cards. The card writer may be an RF writer configured to write information to smart chips of cards.

In other embodiments, a method of reading cards includes receiving card carrier information relating to a card carrier at a processor, reading card information from a card into the processor a first time, reading card information from the card into the processor a second time, and comparing the card information as read the first time to the card information as read the second time. The method also includes rejecting the card if the card information is inconsistent. The method also includes comparing the card information as read either the first time or the second time to the card carrier information and rejecting the card if the card information does not match the card carrier information.

In still other embodiments, a card reader includes means for reading card information from a card a first time and means for reading card information from the card a second time. The card reader also includes processing means for receiving the card information as read both the first time and the second time, comparing the card information as read the first time to card information as read the second time, and rejecting the card if the card information is inconsistent. The card reader may be configured to advance non-rejected cards to a downstream process in which the cards are mounted to card carriers for mailing to a card recipient.

In still other embodiments, a card reading system includes a card mounting apparatus, a card reading apparatus, and a controller. The card mounting apparatus may be configured to receive card carriers, position two or more card carriers to receive cards, read license plate information from each of the at least two carriers, send the license plate information to a controller, receive cards from the card reader, mount the cards to the card carrier, and advance the at least two card carriers to a downstream process. The controller may be configured to receive the license plate information from the card mounting apparatus and use the license plate information to access card carrier information from a data storage arrangement. The card carrier information may be, for example, an account number of each card to be mounted on each of the at least two card carriers. The controller also may be configured to send at least a portion of the card carrier information to the card reading apparatus. The card reading apparatus may be configured to receive card carrier information from the controller at a processor of the card reading apparatus, read first information, such as an account number, from a card into the processor, read second information, such as an account number, from the card into the processor, compare the first information to the second information, reject the card if the first information does not match the second information, compare the account number of the card to the account numbers of the carrier information, reject the card if the account number of the card does not match any of the account numbers of the card carrier information, and send the card to the card mounting apparatus if the card relates to one of the at least two card carriers.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present invention provide a card reader. The card reader is configured to read information from cards prior to the cards being mounted to a card carrier. In some embodiments the cards are read multiple times and the information from each read is compared, thus providing additional accuracy over conventional readers. In some embodiments, the present invention provides a card reader/writer that, in addition to the card reading functions, writes information to cards.

Figure 1A:
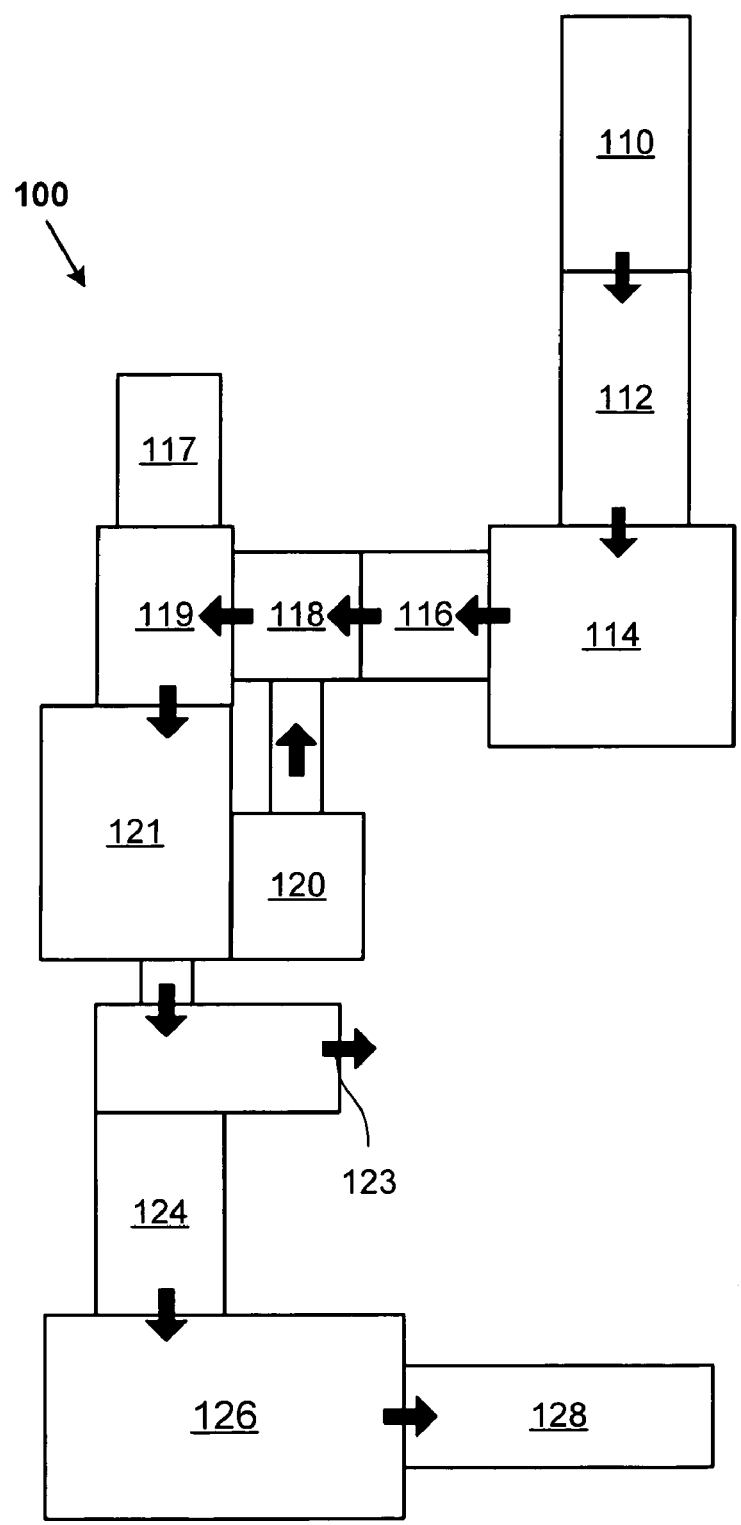
FIGS. 1A and 1B depict simplified schematics of a mail processing systems according to embodiments of the present invention.

Having described embodiments of the invention generally, attention is directed to FIG. 1, which depicts a simplified schematic of a mail processing system 100 according to embodiments of the present invention. System 100 includes a series of stations adapted to produce folded mail items oriented in a specific orientation. The mail items may include cards affixed to or otherwise paired with card carriers. Cards processed by system 100 can include credit cards, debit cards, company and stored-value cards, smart cards, phone cards, and the like. Documents processed by system 100 may include a customer billing statement, a new cardholder agreement, a renewal card statement, a card carrier, and the like. Documents also may include a paper insert, such as an advertisement or the like.

In the embodiment shown in FIG. 1, system 100 includes a printer 110 adapted to print alpha numeric characters on a statement, a sheet of paper, a card carrier, or the like. Printer 110 prints information such as an account number, a customer name and mailing address, a monetary account limit, and the like, and further may print one or more bar codes. In one embodiment, at least one of the bar codes identifies inserts, from a plurality of different inserts, to be sent to a customer.

The printed statements or card carriers (not shown) travel down a belt 112 and are stacked in a stacking unit 114. Further details on stacking unit 114 are discussed in previously-incorporated U.S. patent application Ser. No. 10/045,589, which in one embodiment also operates to at least partially fold the statement or card carrier. The sheets are then sequentially drawn from stacking unit 114 into unit 116.

In one embodiment, unit 116 includes a bar code reader for reading a bar code or other identification mark on the statement or card carrier. The bar code may, for example, identify inserts to be later matched up with the card carrier. In another embodiment, unit 116 also reads a number, such as a three digit number, associated with the card carrier to facilitate proper matching with a card having a corresponding number.

In one embodiment, the carrier is transferred from unit 116 into unit 118. A card is received from unit 120 and matched with the corresponding card carrier in unit 118. In some embodiments, the card is glued, placed in slots or otherwise affixed to the card carrier in unit 118. Additional details on unit 120 are described in previously-incorporated U.S. patent application Ser. No. 10/045,589. The mated card carrier and card are transferred to unit 119. If a processing error has occurred, unit 119 deflects the card and card carrier into a bypass tray or receiving area 117. Processing errors may include, for example, mismatched cards and card carriers, and the like. If no error has occurred, unit 119 deflects the card and card carrier into a folding unit 121.

Folding unit 121 performs a fold of the statement or card carrier. In one embodiment, folding unit 121 performs a second fold of the card carrier, resulting in a card carrier that is approximately the size of a business class envelope. In a particular embodiment, the first and second folds of the card carrier produce a Z-fold card carrier. In other embodiments, the first and second folds of the card carrier produce a chevron-folded card carrier (i.e., a carrier that is twice folded in half width-wise). Folding unit 121 further includes a card detection assembly, which operates to detect if the card is missing or if too many cards have been placed in the card carrier. In one embodiment, the card detection assembly tests a thickness of the card carrier to determine if the appropriate number of cards are contained in the card carrier.

If the card detection assembly indicates an error, such as too many cards or a missing card(s), the card carrier is transferred to a bypass tray or receiving area in the direction shown by arrow 123. If no errors occur, then the card carrier is transferred via conveyor 124 to orientation device 126.

Orientation device 126 operates to properly orient items for further processing. In some embodiments, this involves flipping each item so that the top portion upon entering the orientation device 126 becomes the bottom portion upon exiting the orientation device. In other embodiments, this involves leaving the orientation of each item unchanged.

After passing through orientation device 126, the items are transported down conveyor 128. In some embodiments, system 100 may include additional units to which the items would be transported by conveyor 128. Such processing is explained more fully in previously-incorporated U.S. patent application Ser. No. 10/045,589. In other embodiments, system 100 operates to affix cards to card carriers, but is not used for processing further inserts. In this embodiment, the card carriers and cards are passed down conveyor 128, and removed from system 100. The card carriers may then, if desired, be transported to an envelope stuffing apparatus, a mail room or the like. In other embodiments, the cards and carriers proceed through further automated processing.

It should be apparent to those skilled in the art that, while the system 100 has been described with reference to card carriers and cards, this is not a requirement. Other mail items may be processed using the device and methods disclosed herein. Further, embodiments of the invention do not necessarily include all the units herein described. Other mail processing systems according to embodiments of the invention may include more, fewer, or even different units that those described here. For example, FIG. 1B describes another embodiment of a system for matching cards with card carriers according to an embodiment of the present invention.

Figure 1B:
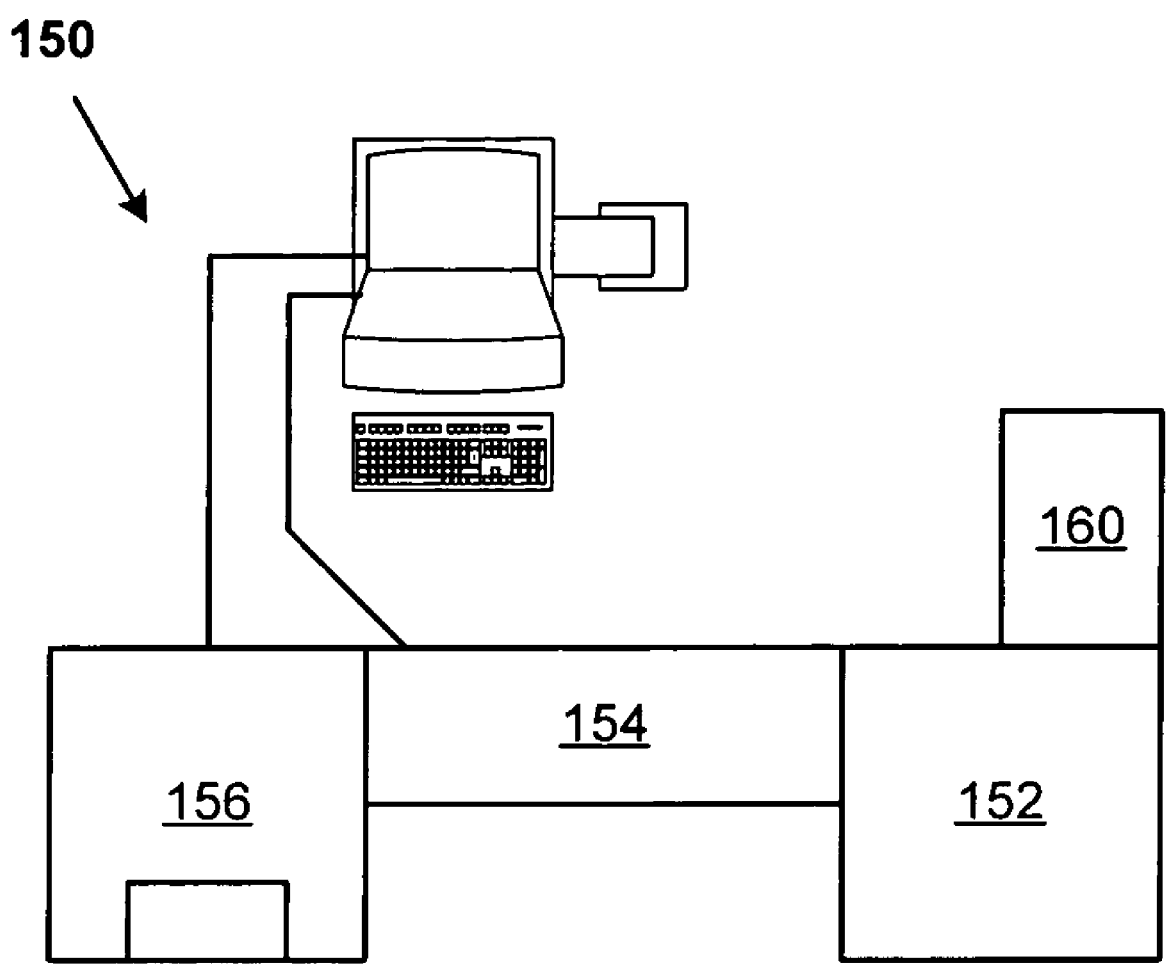

The arrangement 150 of FIG. 1B includes a card picker 152, a card reader/writer 154, a card mounting unit 156, and a controller 158. Using this arrangement 150, cards are mounted on corresponding carriers. The picker includes a hopper 160 from which cards are selected for mounting. In some embodiments, the picker 152 receives cards from an embosser or other upstream process instead of from the hopper 160. The cards may be pre-encoded, partially encoded, or non-encoded. In a specific embodiment, the cards include a mag stripe that is pre-encoded with account information corresponding to a carrier to which the card is to be matched. In another specific embodiment, the cards include a pre-encoded mag stripe and an un-encoded smart card chip. The reader/writer 154 uses information it reads from the mag stripe to write information to the smart card chip. In still another specific embodiment, the cards include a partially-encoded smart card chip and no mag stripe. The reader uses the partial information to locate other relevant information (e.g., accessed through the controller) to write additional information to the smart card chip. Many other such combinations are possible and may involve other encoding media (e.g., bar codes, and the like).

The card mounting unit 156 receives carriers from an upstream process. In some embodiments, the carriers come directly from a carrier printer (not shown). In other embodiments, pre-printed carriers are simply stacked in a receiving tray 162 of the card mounting unit 156. In a specific embodiment, card carriers are stacked in the receiving tray 162 of the card mounting unit 156 in an order that corresponds to the order in which cards are stacked in the hopper 160 of the card picker. Other examples are possible.

In some embodiments, a card carrier stack consists of a continuous run of carriers arranged two across and connected by perforations side-by-side and end-to-end. Thus, a card carrier stack may consist of an accordion-folded stack of such carriers that may be continuously fed into the card mounting unit 156. The carriers may have "D-holes" for receiving diagonally-opposing corners of cards, thus allowing the cards to be mounted to the carriers. In other embodiments, the carriers have slots, glue regions, or other card mounting arrangements. In some embodiments that use D-holes, two cards may be placed in each set of D-holes on a carrier, and a single carrier may have two sets of D-holes. Thus, in arrangements employing side-by-side carriers having two sets of D-holes, up to eight cards may be mounted simultaneously, four two each carrier. Of course, those skilled in the art will appreciate other embodiments having, for example, three side-by-side carries for receiving twelve cards, a single carrier with three or four sets of D-holes, four carriers having mounting slots, and the like.

Carriers are configured to receive multiple cards for several reasons. For example, multiple card holders, each having different accounts, may reside at the same address. Thus, it is convenient to send all cards for the same address in a single mailing. In a more likely example, multiple card holders residing at the same address share the same account. This may be the case if each parent in a family has their own card and one or more children also have a card for the account. This may also be the case if several co-workers all charge to the same company account. In these examples, although the cards are all being mailed to the same address, hence being attached to the same carrier for mailing, the cards may be encoded or embossed with different information.

The methods by which card mounting machines (such as the card mounting unit 156) operate are known. Generally, however, such machines have one or more insert heads into which cards are placed prior to their being mounted to a carrier. Once all cards for a carrier are in place, the insert head mounts the cards. In some examples, this involves bending the cards so that the corners will go into the D-holes. Other examples are known to those skilled in the art.

For purposes of discussion, and not limitation, the card reader/writer 154 will be described in combination with a card picker that receives pre-encoded or partially-encoded cards via a hopper and a card mounting unit that receives pre-printed card carriers via a receiving tray. The card carriers are arranged in groups of two, side-by-side. Each carrier has two sets of D-holes that allow it to receive up to four cards. Thus, a carrier pair may receive up to eight cards at once. The card carriers and cards are inserted into their respective devices in corresponding order. As a carrier pair is moved into place by the card mounting unit 156, "license plate" information is read from each carrier. License plate information may appear on the carrier as a bar code, computer readable text and/or numbers, and/or the like. Using the license plate information, the arrangement 150 may access corresponding account information from a database or other storage arrangement associated with or comprised by the controller 158. Such information may include, for example, the number of cards to be mounted on the carrier, the account number on each card, the account holder's address, a password associated with each account, and the like. This information may be sent to a processor associated with the card reader/writer 154, as will be described.

The card reader/writer 154 receives cards from the hopper 160 via the picker 152. As will be described in more detail hereinafter, information is read from each card by two or more read heads. The information is send to a processor for comparison with the information related to the carriers. If the information from a particular card is consistent for each read of the card and the card corresponds to one of the carriers in position to receive it at the card mounting unit 156, then the card is sent to the insert head of the card mounting unit. Otherwise, the process is interrupted to allow an attendant to fix any problem that may exist. In some embodiments, the cards and/or carriers may be moved to discard trays and the process continues. After all cards for a carrier pair are placed on the insert head, the cards are mounted, and another carrier pair is moved into place as the completed card carriers are moved to the downstream process, which may include separating the carrier pair, folding the individual card carriers, and/or the like.

In some embodiments, the card reader/writer 154 includes write heads that write information to cards. As will be described in more detail hereinafter, the write heads may be any of a number of different write heads (e.g., RF writers that write information to smart card chips embedded within both contact and contactless devices, mag stripe writers that write information to mag stripes, and the like) The read heads may be positioned such that information may be read from cards before cards pass by a write position. This allows time for information to be accessed from, for example, the controller or an associated database. Thus, a number of operating scenarios are possible, several of which are described in more detail hereinafter with reference to FIGS. 3A and 3B.

Briefly, in a first operating scenario, license plate information is read from one or more carriers and the license plate information is used to access additional information relating to the carriers and associated account(s), information such as the account holder or holders' name(s), addresses, passwords, and the like, the account number(s) of the cards, the number of cards, and the like. The information is loaded into a processor associated with the card reader/writer 154. As a mag stripe (or other pre-encoded information storage arrangement, e.g., a bar code) on a card is read, the information is sent to the processor. If the card matches one of the carriers, any of the information in the processor for that card may be written to the card as it passes a write head. As with the initial information read by the card reader/writer 154, the additional information written by the card reader/writer may be verified by one or more read heads located further down the process. In light of this description, those skilled in the art will recognize many other operating scenarios.

Figure 2A:
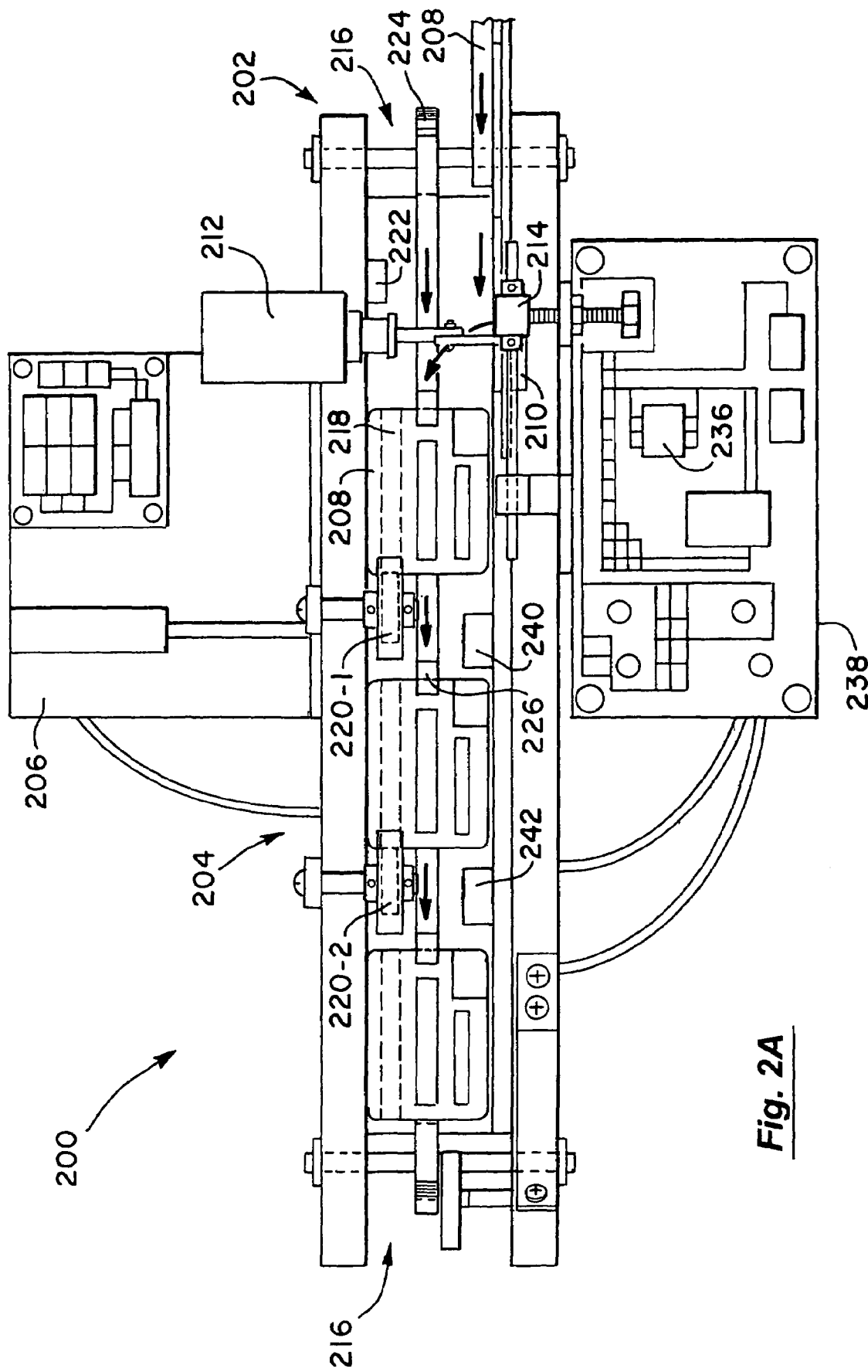
FIGS. 2A and 2B illustrate a card reader according to embodiments of the invention.
Figure 2B:
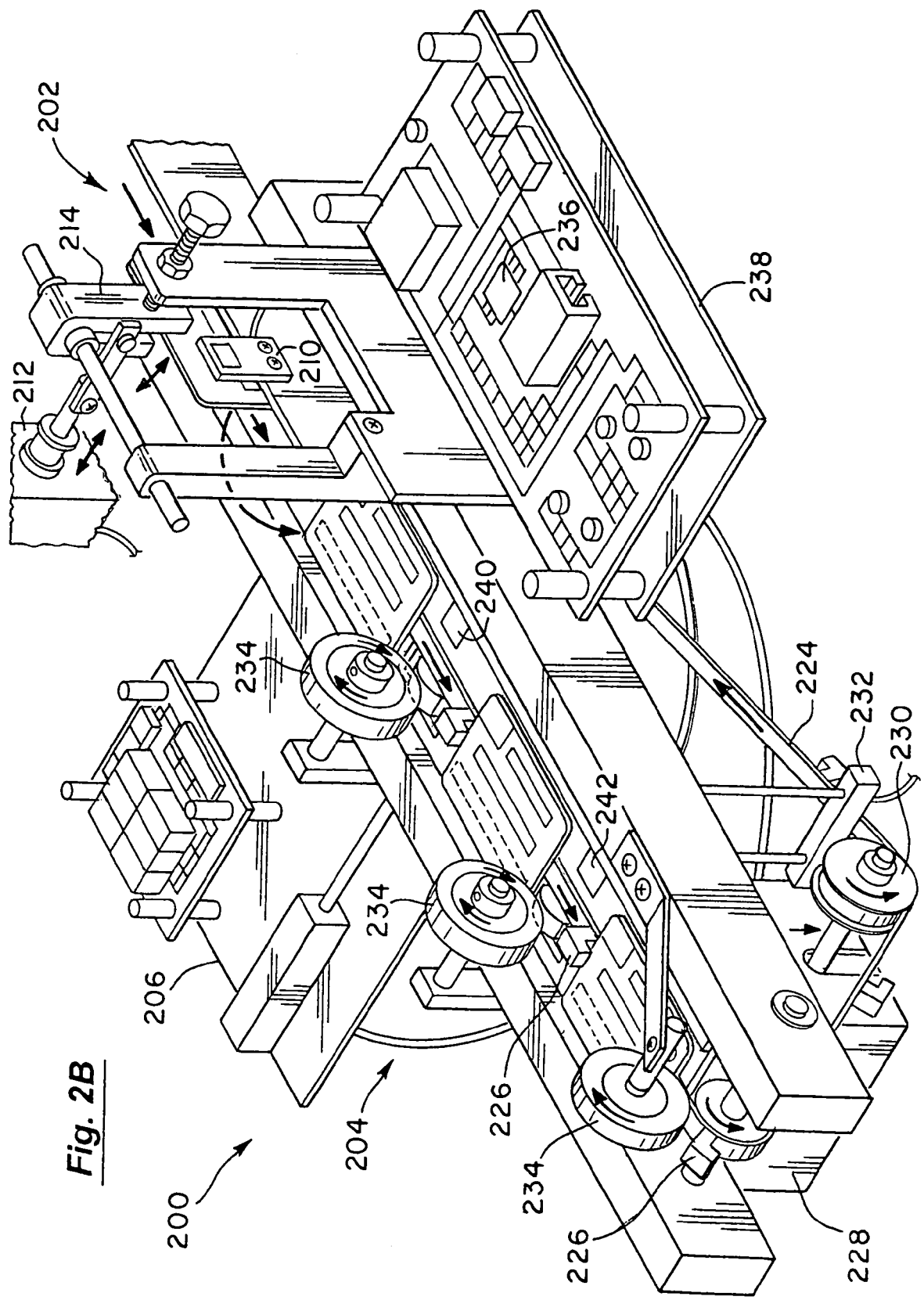

Attention is directed to FIGS. 2A and 2B, which illustrate a card reader/writer 200 according to a specific embodiment of the invention. The card reader 200 includes a receiving and orienting arrangement 202, a card reading arrangement 204, and a logic controller 206. The receiving and orientation arrangement 202 receives cards from an upstream process and orients the cards to be read. Cards are then transported through a series of readers in the card reading arrangement 204 under the control of the logic controller 206. Cards are then passed to a downstream process where they are, for example, placed on card carriers for mailing to recipients.

In the embodiment of FIGS. 2A and 2B, the card reader/writer 200 receives cards 208 at the receiving and orienting arrangement 202 from, for example, an embosser, a card picker, or a hopper. Movement of cards 208 into the receiving and orienting arrangement 202 may be provided by the upstream process. In this embodiment, cards 208 are received in a vertical orientation. The cards 208, according to this embodiment, have magnetic stripes with encoded information, although in other embodiments, cards may be otherwise encoded. Cards are received such that the magnetic stripe is positioned on the upper portion of the card on the side toward the top of FIG. 2A. A first sensor 210, such as an optical sensor, camera, or proximity switch, senses the presence of a card. A signal from the sensor 210 to an actuator 212 causes the actuator 212 to move an orienting arm 214 that places the card in a horizontal position in a track 216. In this orientation, the magnetic stripe 218 on each card 208 is facing down and aligned with read heads 220-1 and 220-2 (as can be appreciated from the dashed outline of the magnetic stripe 218). Once a card is positioned in the track 216 with its magnetic stripe facing down and aligned with the readers 220, a second sensor 222, such as an optical sensor, camera, or proximity switch, senses that a card is present and positioned for reading.

Movement of cards through the card reading arrangement 204 is provided by a drive belt 224. The drive belt 224 includes hooks 226 that engage cards and move them along the track 216. A motor 228, such as a servo or stepper motor, drives the belt under the control of the logic controller 206. A tensioning idler 230 maintains the drive belt 224 at the appropriate tension.

Movement of the drive belt 224 may be incremental or continuous. In a specific embodiment, the belt is moved incrementally with the increment being the distance between hooks 226. A third sensor 232, such as an optical sensor, senses the position of hooks 226 along the drive belt 224. When the second sensor 222 senses the presence of a card 208, it sends a signal to the logic controller 206 so indicating. The logic controller 206, at an appropriate time, signals the motor 228 to move the drive belt 224. When the third sensor 232 senses the next hook 226 on the drive belt 224, it signals the logic controller 206, which signals the motor 228 to stop advancing the belt.

As cards 208 move incrementally along the track 216, read heads 220 read encoded information from each card. In this embodiment, the read heads 220 are magnetic stripe readers. Wheels 234 provide pressure that maintains the cards in contact with the read heads 220. In other embodiments, the read heads 220 may read information in a different way. For example, if the cards 208 are encoded with bar code information, then the read heads 220 may comprise bar code readers. If the cards are encoded with radio frequency (RF) information, then the read heads may be RF readers. Many other such examples are possible. In some embodiments, the read heads 220 comprise read/write heads.

The read heads 220 of this embodiment are configured to read three tracks of the magnetic stripes 218 on the cards 208. In other embodiments employing magnetic stripe readers, the readers may only read one track. The read heads 220 are configured to send information to a reader processor 236 on the reader board 238. The reader processor 236 interprets the information from the magnetic stripe and compares the information read by each head. If the read heads 220 comprise read/write heads, then the read/write heads may receive information from the processor 236 to be written to the cards.

In some embodiments, the reader/writer 200 includes one or more writers 240 that are separate from the read heads 220. The writer 240 may be positioned to write information to a card after one or more of the read heads 220 have read information from the card. The writer 240 may be configured to receive information from the processor. Thus, a writer 240 may write information that the one of the readers previously read or may write other information from the processor (e.g., information obtained from a database using the card carrier license plate). In some embodiments, the reader/writer 200 also includes an additional reader 242 of the same type (i.e., capable of reading the same media) as the writer 240 positioned so as to read/verify the information written using the writer 240. The information may be sent to the processor, and a card may be rejected if the information read by the reader 242 does not match the information intended to be written to the card. The writer 240 and the reader 242 may comprise use RF, bar code, Optical Character recognition, ink jet printing, magnetic encoding, or like technologies.

The processor 236 may be any of a variety of processors, including, for example a Stamp, PIC, Jack Rabbit processor, or Field Programmable Gate Array (FPGA). The processor may be programmed to operate according to any of the embodiments described herein. Via input/output ports, the processor may receive information from and/or send information to: a card mounting device; a process controller; any of the readers, writers, read heads, write heads, or read/write heads discussed herein; and/or other devices. The processor may compare any of the information it receives and reject cards or signal operators to correct failures if any programmed condition occurs. Those skilled in the art will appreciate how to program the processor in light of this disclosure and the description of the methods that follow.

In some embodiments, the present invention includes other I/O ports that allow the card reader to interface and share information with other process equipment.

Figure 3A:
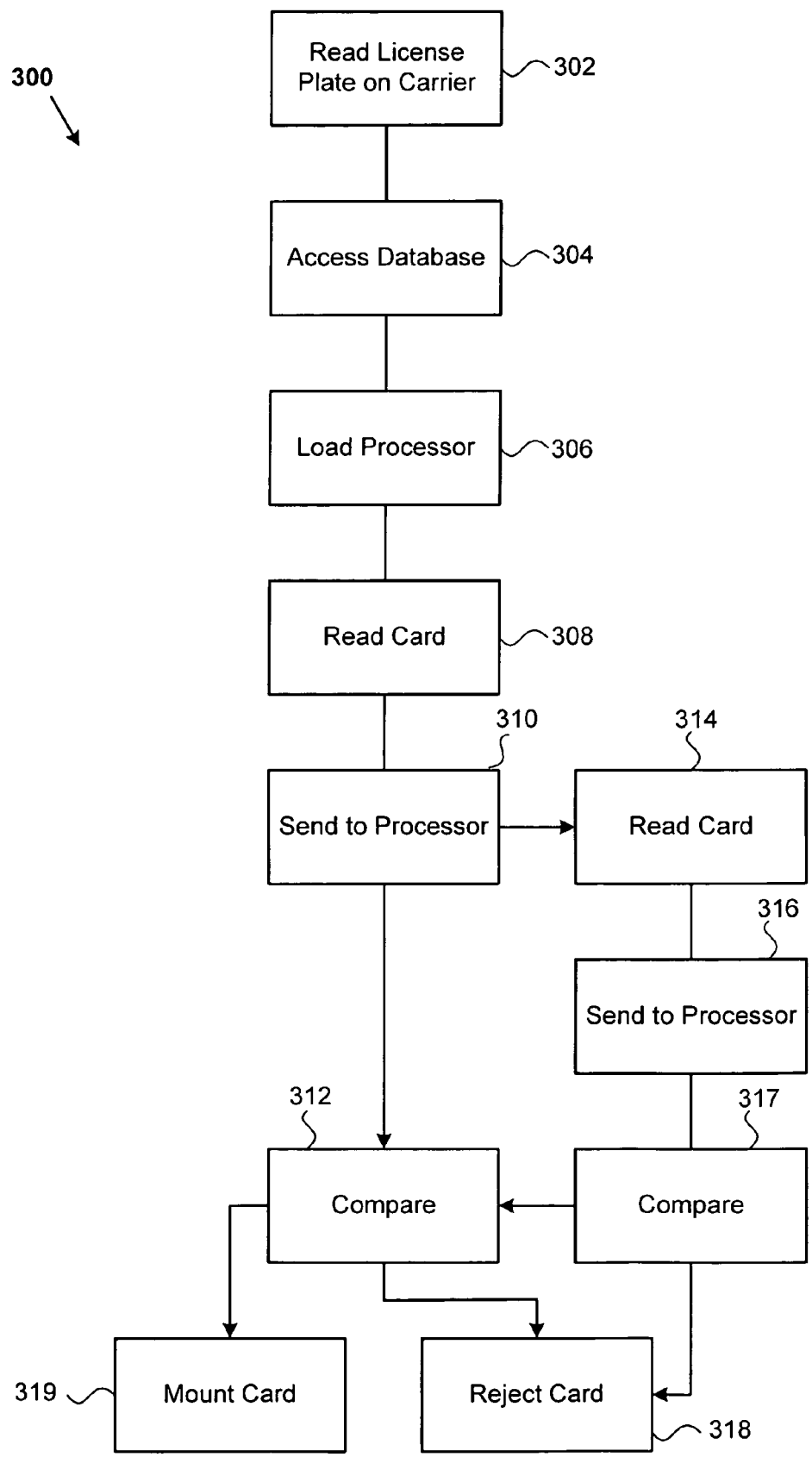
FIGS. 3A and 3B illustrate methods of reading information from and writing information to cards according to embodiments of the invention.
Figure 3B:
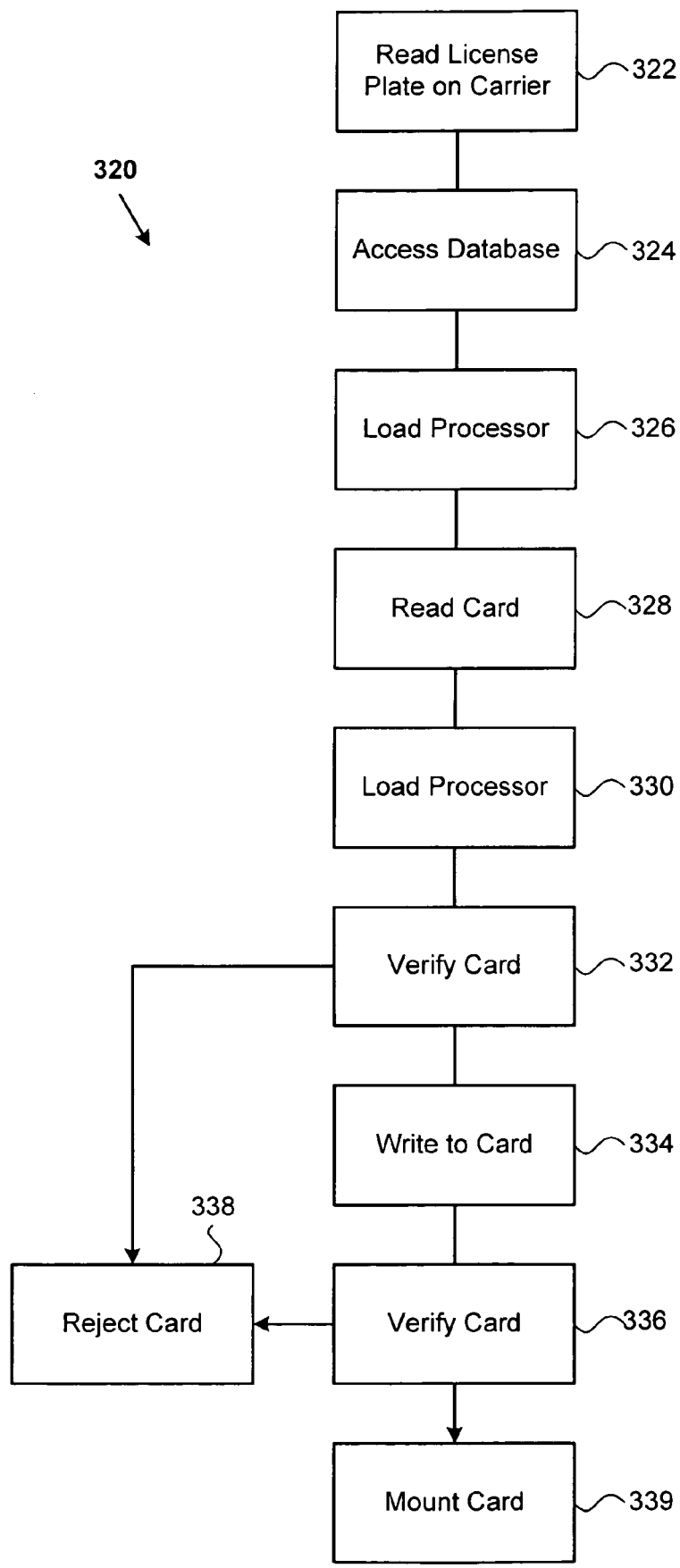

Having described a card reader/writer according to embodiments of the invention, attention is directed to FIGS. 3A and 3B, which depict methods of using card readers/writers according to embodiments of the invention. FIG. 3A illustrates a first method 300 of reading cards and verifying the information written on the cards. At block 302, license plate information is read from a carrier. The license plate information may be any information that associates the carrier with one or more specific cards. The license plate information may be embodied in a bar code, a mag stripe, machine readable characters, or the like, or any such combination. In some embodiments, license plate information is read from a plurality of carriers positioned to receive cards.

At block 304, the license plate information is used to access additional information from a database. The database may be any storage arrangement configured to maintain information relating to the cards. The additional information may be, for example, the number of cards to be placed on the carrier, the account numbers on the cards, the account holders' names, their addresses, associated account passwords, and the like. In a specific embodiment, the license plate relates to a number of account holders at a single household. Several members of the household are to receive cards, each card having a different account number and the account holder's name embossed on the card. The individual accounts may be commonly related under a primary account holder who, for example, is to receive statements relating to the accounts and who is ultimately responsible for settling charges associated with the accounts. Each individual card holder may receive statements for charges associated with their account. This is but one example. Many others are possible and apparent to those skilled in the art in light of this disclosure. For example, the cards may all be related through a business entity, and the individual cardholders may be employees of the entity.

Any or all of the information associated with the carrier may be loaded into a processor associated with a card reader/writer at block 306. At block 308, information is read from a card. The information may be read using any of the previously-described readers, including, for example, a mag stripe reader, a RF reader, a combination read/write head, a bar code reader, of the like. The information is sent to the processor at block 310.

At block 312, the information read from the card is compared to the information previously loaded into the processor. If the information matches (i.e., if the card is associated with the carrier), then the card is mounted to the carrier. In some embodiments, the card is read a second time at block 314, loaded into the processor at block 316, and the information from each of the reads is compared at block 317. Thus, if the information from the two reads does not match or the information read does not match the carrier, the card may be rejected at block 318 or mounted at block 319. In some embodiments, the logic may allow a twice-read card to be mounted even if one of the reads was unsuccessful, provided the initial read matches the carrier. In a specific embodiment, the information from each of the two reads is loaded into the same processor.

Attention is directed to FIG. 3B, which illustrates a second method 320 of reading information from and writing information to cards. As with the previously-described method, the information begins by reading information from a license plate of a carrier at 322, using the license plate information to access additional information at block 324, and loading the information into a processor at block 326. At block 328, a card is read and the information is loaded into the processor at block 330. At block 332, the card is verified, which may include comparing two reads to each other and confirming that the card matches the carrier.

At block 334, information is written to the card. The information may be written using an RF writer, a mag stripe writer, or other suitable writer. The information may comprise any of the information in the processor, which includes information previously read from the card or information accessed from other systems. In some embodiments, the just-written information is verified by reading it at block 336. The card may be rejected at block 338 if the reads do not match each other or the correct information for the carrier. If all checks are successful, however, the card may be mounted at block 339. As with the previously-described embodiment, multiple carriers may be positioned to receive multiple cards.

It should be noted that all steps of the previously-described embodiments are not essential. For example, in the method 320, it is not essential to access additional information to be written to a card. The same information read from the card may be written to a different storage media on the card. Further, the steps of the previously-described methods may be traversed in orders other than that described. Further still, other embodiments may include additional steps not described herein but apparent to those skilled in the art. Thus, the previously-described methods are not to be considered limiting.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention, which is defined in the following claims.

What is claimed is:

1. A card reader, comprising:
   a receiving arrangement configured to sequentially receive cards from an upstream process and position the cards to be read;
   a first reader configured to read card information from a first encoded region of cards a first time;
   a second reader configured to read card information from the first encoded region of cards a second time, wherein the second reader is positioned such that the information is read by the second reader after the information is read by the first reader;
   an advancing mechanism configured to advance cards from the receiving arrangement, through the first and second readers, to a downstream process;
   a processor programmed to:
      receive and store card carrier information for each of at least two card carriers, wherein the card carrier information identifies at least one card relating to each card carrier;

receive card information relating to a specific card from the first reader;

receive card information relating to the specific card from the second reader;

compare the card information as read by the first reader to the card information as read by the second reader and reject the specific card if the card information is inconsistent;

compare the card information as read by either the first or second reader to the card carrier information for each of the at least two card carriers; and reject the specific card if the card information does not match the card carrier information for one of the at least two card carriers; and a card mounting unit configured to mount cards to one of the at least two carriers if the card's card information matches the card carrier information of the carrier.

2. The card reader of claim 1, wherein the first and second readers comprise mag stripe readers.

3. The card reader of claim 1, wherein:

the card carrier information comprises account numbers for each of a plurality of cards relating to the at least two card carriers;

the card information comprises account numbers of cards; and the processor is further programmed to compare the account numbers of the card information to the account numbers of the card carrier information and reject a particular card if the account number of the card information does not match any account number of the plurality of cards relating to the at least two card carriers.

4. The card reader of claim 1, further comprising:

a writer configured to write information to cards.

5. The card reader of claim 4, wherein the writer is configured to write at least a portion of the card carrier information to cards.

6. The card reader of claim 4, wherein the writer is configured to write at least a portion of the card information to cards.

7. The card reader of claim 4, wherein the card writer comprises an RF writer configured to write information to smart chips of cards.

8. The card reader of claim 1, wherein the cards are selected from a group of cards consisting of credit cards, stored value cards, smart cards, retailer cards, and gift cards.

* * * * *